(12) United States Patent
Lindberg et al.

(10) Patent No.: US 12,251,681 B2
(45) Date of Patent: Mar. 18, 2025

(54) METHOD OF MANUFACTURING AGAR OR AGAROSE BEADS

(71) Applicant: Cytiva Bioprocess R&D AB, Uppsala (SE)

(72) Inventors: Susanna Lindberg, Uppsala (SE); Jonas Gustafsson, Uppsala (SE); Linn Carlsson, Uppsala (SE); Anders Hagvall, Uppsala (SE); Erik Ringberg, Uppsala (SE); David Jansson, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 708 days.

(21) Appl. No.: 17/605,502

(22) PCT Filed: Apr. 28, 2020

(86) PCT No.: PCT/EP2020/061790
§ 371 (c)(1),
(2) Date: Oct. 21, 2021

(87) PCT Pub. No.: WO2020/221762
PCT Pub. Date: Nov. 5, 2020

(65) Prior Publication Data
US 2022/0219141 A1     Jul. 14, 2022

(30) Foreign Application Priority Data

Apr. 29, 2019  (GB) ...................................... 1905919

(51) Int. Cl.
*B01J 20/29*     (2006.01)
*B01J 20/24*     (2006.01)
(Continued)

(52) U.S. Cl.
CPC ............. *B01J 20/291* (2013.01); *B01J 20/24* (2013.01); *B01J 20/28019* (2013.01);
(Continued)

(58) Field of Classification Search
CPC ................. B01J 20/24; B01J 20/28019; B01J 20/28047; B01J 20/291; B01J 20/3007;
(Continued)

(56) References Cited

U.S. PATENT DOCUMENTS 6,117,915 A    9/2000 Pereira
6,548,557 B1   4/2003 Fogel
(Continued)

FOREIGN PATENT DOCUMENTS

CN    103055773 A    4/2013
CN    102389755 B    7/2014
(Continued)

OTHER PUBLICATIONS

Machine translation of Tan et al (CN 102389755). (Year: 2012).*
(Continued)

*Primary Examiner* — Brian A McCaig
(74) *Attorney, Agent, or Firm* — Eversheds-Sutherland (US) LLP (57) ABSTRACT

The invention discloses method for manufacturing agar or agarose beads, comprising the steps of: a) providing a water phase comprising an aqueous solution of agar or agarose at a temperature of 40-100° C.: b) providing an oil phase comprising a water-immiscible solvent and an emulsifier at a temperature of 40-100° C.; c) emulsifying the water phase in the oil phase to form a water-in-oil emulsion: d) cooling the water-in-oil emulsion to a temperature below a gelation temperature of the agar or agarose to form a dispersion of solidified agar or agarose beads: and e) recovering agar or
(Continued)

agarose beads from dispersion, wherein the emulsifier comprises a phosphate ester of an alkoxylated fatty alcohol.

28 Claims, 4 Drawing Sheets

(51) Int. Cl.
  *B01J 20/28* (2006.01)
  *B01J 20/291* (2006.01)
  *B01J 20/30* (2006.01)

(52) U.S. Cl.
  CPC ..... *B01J 20/28047* (2013.01); *B01J 20/3007* (2013.01); *B01J 20/3085* (2013.01); *B01J 2220/52* (2013.01)

(58) Field of Classification Search
  CPC .............. B01J 20/3085; B01J 2220/52; C08B 37/0003; C08B 37/0039; C08J 3/03; C08J 3/16; C08J 2305/12; C08L 5/12
  See application file for complete search history.

(56) References Cited

U.S. PATENT DOCUMENTS

| | | |
|---|---|---|
| 2010/0084345 A1 | 8/2010 | Lindgren |
| 2018/0171484 A1 | 6/2018 | Kosvintsev |

FOREIGN PATENT DOCUMENTS

| | | |
|---|---|---|
| CN | 103980519 B | 8/2016 |
| EP | 3037166 A1 | 6/2016 |
| WO | WO1989011493 A1 | 11/1989 |

OTHER PUBLICATIONS

PCT International Search Report and Written Opinion for PCT/EP2020/061790 mailed Aug. 24, 2020 (12 pages).

GB Search and Examination Report for GB1905919.5 mailed Dec. 2, 2019 (5 pages).

KR Notice Third Party Submission for corresponding KR Application for 10-2021-7034048, mailed Aug. 22, 2023 (2 pages). No Translation Available.

\* cited by examiner

METHOD OF MANUFACTURING AGAR OR AGAROSE BEADS

CROSS REFERENCE TO RELATED APPLICATIONS

This application claims the priority benefit of PCT/EP2020/061790, filed on Apr. 28, 2020, which claims the benefit of GB Application No. 1905919.5, filed on Apr. 29, 2019, the entire contents of which are incorporated by reference herein.

TECHNICAL FIELD OF THE INVENTION

The present invention relates to agar/agarose beads, and more particularly to a method for manufacturing agar or agarose beads. The invention also relates to emulsifiers suitable for use in the method.

BACKGROUND OF THE INVENTION

Agarose beads have for several decades been used as a stationary phase in chromatographic separations of proteins and other biomacromolecules. They are typically prepared by inverse suspension gelation, where a hot aqueous solution of agarose or agar is emulsified in a hot oil phase to form a water-in-oil (W/O) emulsion. The emulsion is then cooled below the gelation temperature of the agarose/agar to create gel beads, which can then be recovered and used for separation purposes. Such processes are described e.g. in S Hjertén: Biochim Biophys Acta 79(2), 393-398 (1964), WO1989011493A1 and US20180171484, hereby incorporated by reference in their entireties. A variant where agar beads are converted to agarose beads by hydrolysis of sulfate groups post-gelation is described in US20100084345, also incorporated by reference in its entirety.

In the process it is essential to use an emulsifier for stabilization of the W/O emulsion. The emulsifier will also be important for the size distribution of the resulting beads and for their shape. Further, the emulsifier should be easy to remove from the beads by washing and it should be environmentally friendly and not give rise to any toxic leachables when the beads are used for manufacturing of pharmaceuticals.

The emulsifiers previously disclosed are lacking in several of these aspects and accordingly, there is a need for further emulsifiers.

SUMMARY OF THE INVENTION

One aspect of the invention is to provide a method for the manufacturing agar or agarose beads. This is achieved with a method comprising the steps of:
a) providing a water phase comprising an aqueous solution of agar or agarose at a temperature of 40-100° C.;
b) providing an oil phase comprising a water-immiscible solvent and an emulsifier at a temperature of 40-100° C.;
c) emulsifying the water phase in the oil phase to form a water-in-oil (W/O) emulsion;
d) cooling the W/O emulsion to a temperature below a gelation temperature of the agar or agarose to form a dispersion of solidified agar or agarose beads; and
e) recovering agar or agarose beads from the dispersion, wherein the emulsifier comprises a phosphate ester of an alkoxylated fatty alcohol.

One advantage is that aggregation of the beads during step d) is prevented, such that well-dispersed beads of high sphericity are produced. Further advantages are that the emulsifier is water-soluble, facilitating removal by water washing, and that it is free from endocrine disruptors such as alkyl phenol derivatives.

A further aspect of the invention is to provide agar or agarose beads obtainable by the above method.

Further suitable embodiments of the invention are described in the dependent claims.

DETAILED DESCRIPTION OF EMBODIMENTS

In one aspect, the present invention discloses a method for the manufacturing agar or agarose beads. The method comprises the steps of:
a) Providing a water phase comprising an aqueous solution of agar or agarose at a temperature of 40-100° C. The water phase may e.g. comprise 1-8 wt. % agar or agarose, such as 2-7 wt. % agar or agarose, e.g. about 2 wt. %, about 4 wt. % or about 6 wt. %. The water phase can further comprise one or more buffer components such as a weak base. The agar or agarose may be native agar, native agarose or a derivative of agar or agarose, such as e.g. allyl agarose or hydroxyethyl agarose, further described in U.S. Pat. Nos. 6,602,990 and 7,396,467, hereby incorporated by reference in their entireties;
b) Providing an oil phase comprising a water-immiscible solvent and an emulsifier at a temperature of 40-100° C. (suitably at a temperature below the boiling point of the solvent). The water-immiscible solvent can e.g. be a hydrocarbon, an ester or a ketone. To facilitate an efficient solvent recovery, the solvent may have a boiling point in the range of about 90-170° C., such as 90-150° C., or 100-120° C., at atmospheric pressure. It can e.g. be toluene (b.p. 111° C.) or xylene (b.p. about 140° C.: 139° C. for m-xylene and 144° C. for o-xylene). Alternatively, it can be a cyclic ketone, such as 2-methylcyclohexanone (b.p. 162-163° C.). It is also possible to use higher-boiling solvents, such as mineral oils or vegetabilic oils, although the solvent may then be more difficult to recover. The nature of the emulsifier is further described below. The emulsifier may be a single emulsifier or the oil phase may comprise a mixture of several emulsifiers. The concentration of the emulsifier (or the total emulsifier concentration) in the oil phase may e.g. be 0.01-2 wt. %, such as 0.015-1 wt. %. Suitably, none of the emulsifiers comprises alkyl phenols or alkyl phenol derivatives. The oil phase can e.g. comprise less than 0.1 wt %, such as less than 0.01 or less than 0.001 wt % alkyl phenols or alkyl phenol derivatives. It can even be devoid of alkyl phenols and alkyl phenol derivatives;

c) Emulsifying the water phase in the oil phase to form a water-in-oil (W/O) emulsion. The emulsification may comprise mixing the water phase and the oil phase in an agitated vessel to form a W/O emulsion. The step may further comprise passing the W/O emulsion through a rotor-stator mixer, a static mixer or a porous membrane to reduce a droplet size of the W/O emulsion. In an alternative way of forming the emulsion, the water phase can be passed through a porous membrane or sieve plate into the oil phase to form a W/O emulsion;

d) Cooling the W/O emulsion to a temperature below a gelation temperature of the agar or agarose to form a dispersion of solidified agar or agarose beads. This step can be performed by gradually cooling the emulsion in an agitated vessel or it can be performed in continuous mode by passing the W/O emulsion through a conduit with a longitudinally decreasing temperature gradient;

e) Recovering agar or agarose beads from the dispersion. The recovery may comprise adding water or an aqueous solution to the dispersion obtained in step d), decanting the oil phase and recovering the agar or agarose beads as a sediment. The beads may further be washed with water or an aqueous solution to remove residual emulsifier and/or other substances. Washing with organic solvents can also be applied for removal of emulsifier residues and other leachables.

After step e), the beads may be crosslinked in a step f), by adding a crosslinking agent, e.g. epichlorohydrin. They may further be functionalized with ligands in a step g), where the ligands are covalently coupled, using methods known to the skilled person. Step g) can suitably be performed after step f), although it is also possible to couple ligands on non-crosslinked beads.

The beads prepared by the process can be used in chromatographic separation processes or in batch adsorption processes. They may e.g. have diameters (expressed as the volume-weighted median diameter d50,v) in the range of 5-500 μm, such as 10-350 μm or 30-120 μm.

The emulsifier as mentioned above comprises a phosphate ester of an alkoxylated fatty alcohol. Typically, it can comprise a mixture of phosphate monoester and phosphate diester of the alkoxylated fatty alcohol. The fatty alcohol may comprise one or more $C_{10}$-$C_{20}$ linear or branched, primary or secondary, alkanols or alkenols and/or the ethoxylated fatty alcohol may have a structure I

$$R_1\text{—}O\text{—}(R_2\text{-}O)_n\text{—}H \qquad (I)$$

where:
R$_1$ is a saturated or unsaturated, linear or branched, aliphatic $C_{10}$-$C_{20}$ hydrocarbon, such as a saturated or unsaturated linear aliphatic $C_{10}$-$C_{18}$ hydrocarbon,
R$_2$ is —CH$_2$-CH$_2$— or a mixture of —CH$_2$-CH$_2$— and —CH$_2$(CH$_3$)—CH$_2$—, and
n is 2-20, such as 2-10 or 2-5.

This structure describes an ethoxylated or mixed ethoxylated/propoxylated fatty alcohol, with average alkoxylation degree of n. The alkoxylated fatty alcohol has then been converted into phosphate ester of structure II and III, where II is a phosphate monoester and III is a phosphate diester:

$$R_1\text{—}O\text{—}(R_2\text{-}O)_n\text{-}P(O)\text{—}OH \qquad (II)$$

$$R_1\text{—}O\text{—}(R_2\text{-}O)_n\text{-}P(O)\text{-}(O\text{-}R_2)_n\text{—}O\text{-}R_1 \qquad (III)$$

where:
R$_1$ is a saturated or unsaturated, linear or branched, aliphatic $C_{10}$-$C_{20}$ hydrocarbon, such as a saturated or unsaturated linear aliphatic $C_{10}$-$C_{18}$ hydrocarbon,
R$_2$ is —CH$_2$—CH$_2$— or a mixture of —CH$_2$—CH$_2$— and —CH$_2$(CH$_3$)—CH$_2$—, and
n is 2-20, such as 2-10 or 2-5.

Both the phosphate monoester II and the diester III are acidic compounds, with acidic hydrogens that can be dissociated. The phosphate ester emulsifiers of the invention can thus be supplied either in acid form or in neutralized form (e.g. as sodium salts or alternatively as potassium or ammonium salts). If emulsifiers in acid form are used, a base may suitably be added to the water phase to adjust the pH to near neutral, as agar and agarose are sensitive to degradation under acidic conditions. In addition to the monoester II and diester III, the emulsifier may also comprise the corresponding phosphate triester of the alkoxylated fatty alcohol and the free, non-esterified alkoxylated fatty alcohol. Both of these compounds are non-acidic and are usually present in minor amounts, such as <25 wt % or less than 15 wt % of the emulsifier.

In particular, the emulsifier may comprise a mixture of phosphate monoester and phosphate diester of a mixed ethylene oxide+propylene oxide adduct of a $C_{10}$-$C_{16}$ alkanol. Such a product is commercially available under the name of Lubrhophos™ LF-800 (Solvay). Alternatively, the emulsifier may comprise a mixture of phosphate monoester and phosphate diester of ethoxylated oleyl alcohol with n=3 (average number of ethylene glycol units per oleyl alcohol). Such a product is generally known under the INCI (International Nomenclature of Cosmetic Ingredients) name of oleth-3 phosphate and is commercially available under the trade name of Crodafos™ O3A (Croda).

EXAMPLES

Emulsification Method

A solution of 35 g agarose in 490 ml of water was prepared at 95° C. and subsequently cooled to 70° C. after addition of 7.0 mM phosphate to give pH 7.0. A solution of emulsifier in 850 ml toluene was prepared and heated to 60° C. in a 3 L thermostated jacketed cylindrical glass reactor. Under agitation with an overhead agitator, the agarose solution was added to the reactor under 80 rpm agitation and the agitation was continued with stepwise increasing rpm at 60° C. until the agarose droplet size was approximately 100 μm, as assessed from samples removed and analysed by laser diffraction. These samples were rapidly cooled with ice to avoid any coalescence/aggregation before the analysis. The temperature of the reactor jacket was then lowered to 20° C. to solidify the agarose droplets. The resulting agarose beads were washed with toluene and/or water, the washing liquids were decanted while the agarose beads were recovered as a sediment.

Evaluation Methods

The particle size distribution was measured using a Mastersizer 3000 laser diffraction instrument (Malvern Panalytical) for agarose beads in an ethanol dispersion with ethyl cellulose as a dispersant. The distributions were plotted as differential volume vs diameter curves and the mode of each distribution was calculated by the instrument. The mode is the peak of the distribution, i.e. the highest peak seen in the distribution curve. The mode thus represents the particle size most commonly found in the distribution. Samples were taken both before and after the cooling of the emulsions and the difference between the mode after cooling and the mode before cooling was denoted Δ mode. This is a measure of the particle size increase during cooling, indicative of coalescence and/or aggregation occurring during the sensitive cooling phase.

Figure 1:
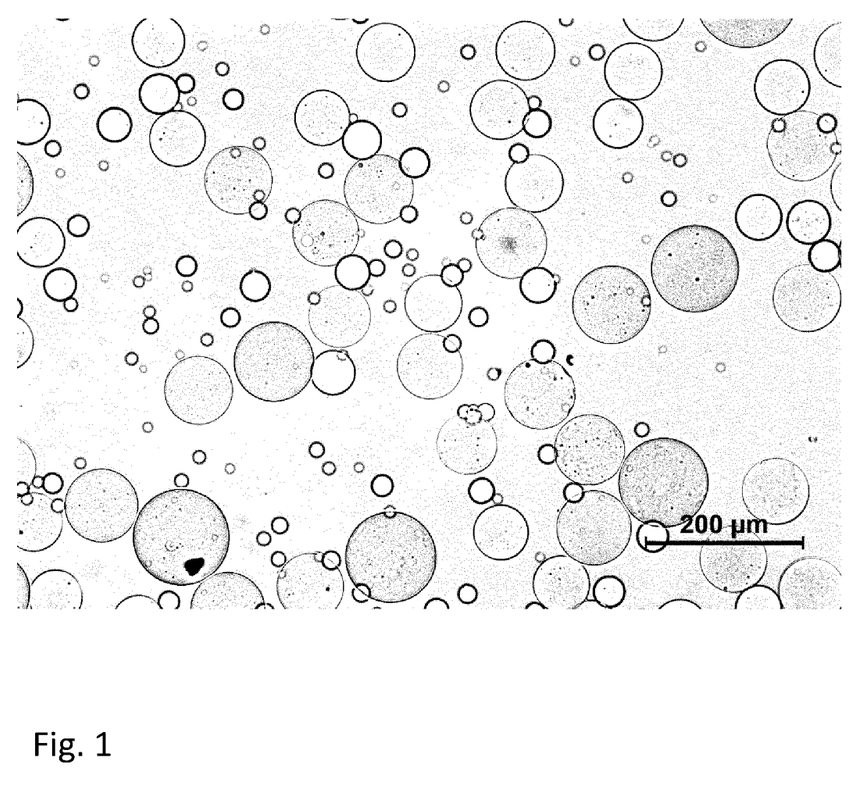
FIG. 1 shows an example of well-dispersed, spherical agarose beads formed from a well-stabilized W/O agarose emulsion.
Figure 2:
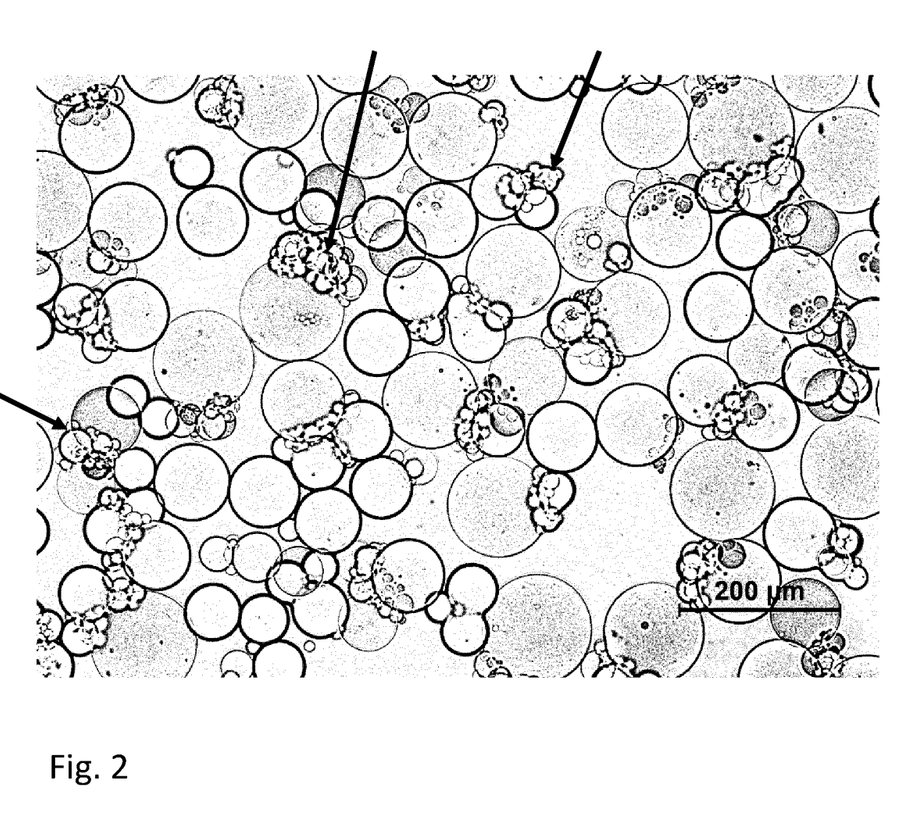
FIG. 2 shows an example of agarose beads with aggregates (indicated by arrows) that may form during cooling of a W/O agarose emulsion.
Figure 3:
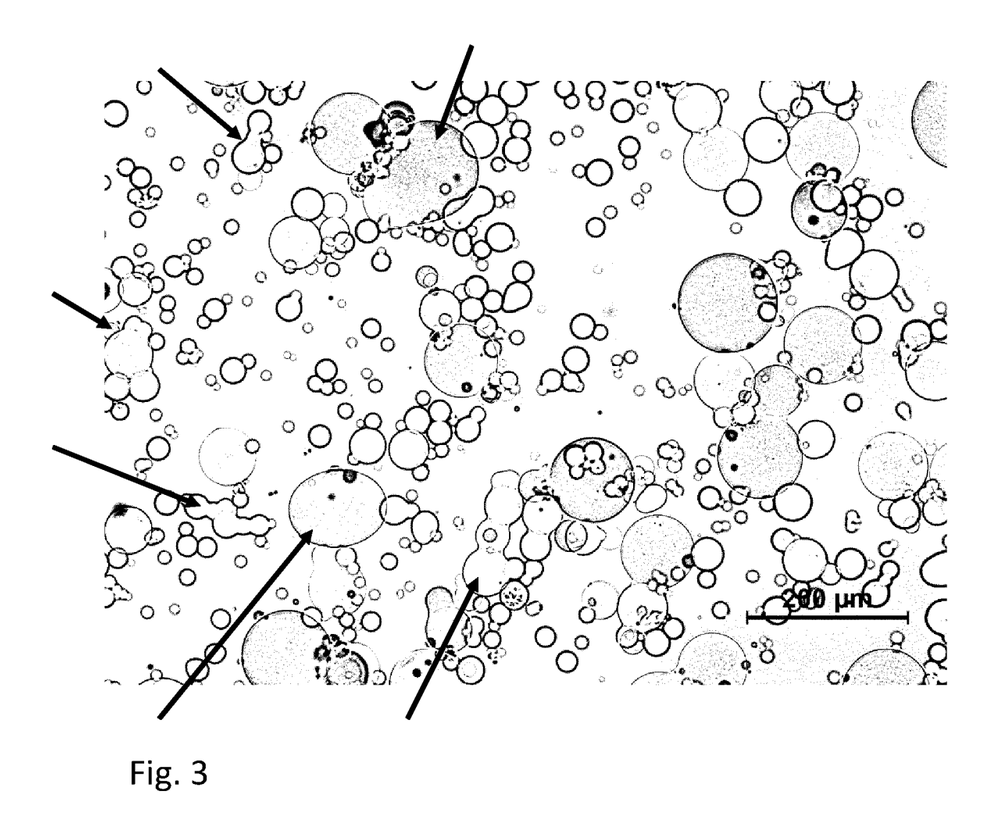
FIG. 3 shows an example of agarose beads with non-spherical, partially coalesced beads (indicated by arrows).
Figure 4:
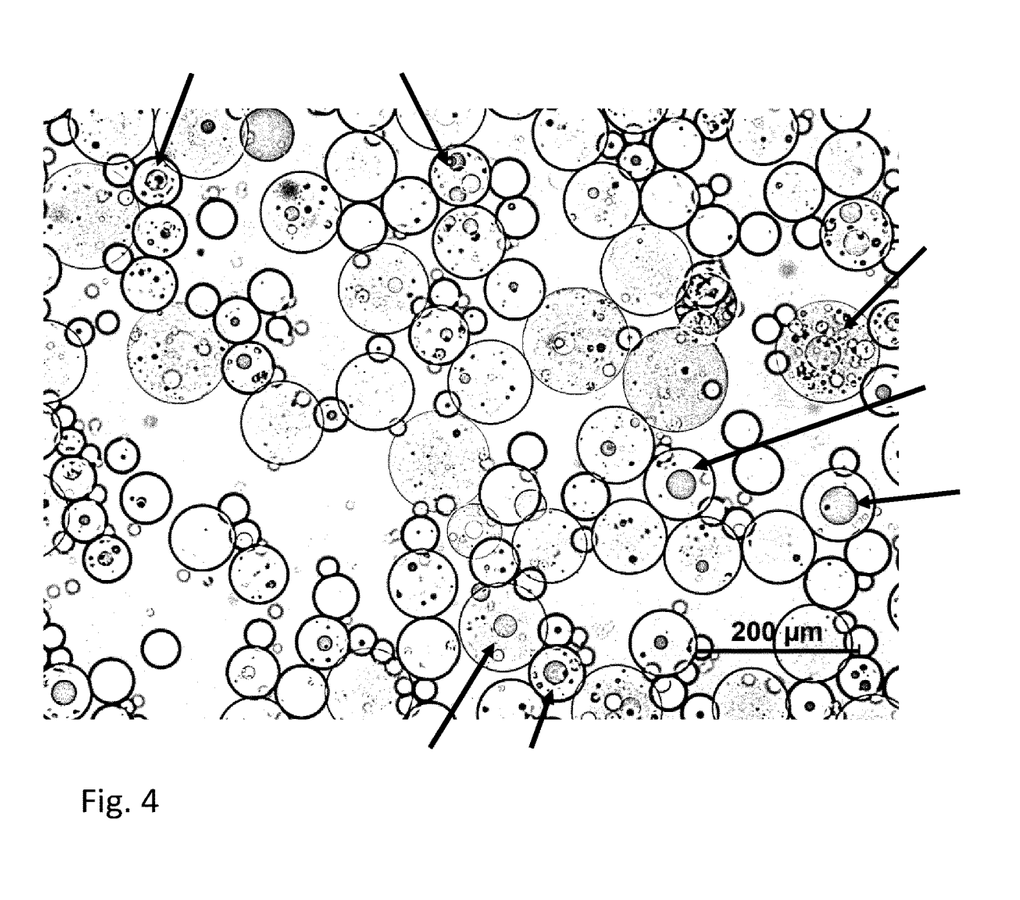
FIG. 4 shows an example of agarose beads with spherical inclusions in the beads (indicated by arrows), caused by O/W/O double emulsion formation.

The beads were also evaluated visually in a microscope with respect to inclusions in the beads (which may result from oil-in-water-in-oil double emulsion formation) and spherical shape, where deviations from spherical shape may be due to partial coalescence of droplets. Examples of aggregates, non-spherical beads and beads with inclusions are shown in FIGS. 2-4.

Emulsifiers

TABLE 1

Emulsifiers used.

| Product name | Supplier | Chemical structure | Fatty alcohol moiety | Ethylene oxide units (n) |
|---|---|---|---|---|
| Lubrhophos LF-800 | Solvay | C10-16 ethoxylated/propoxylated phosphate | C10-16 | |
| Lubrhophos LB-400 | Solvay | Polyoxyethylene oleyl ether phosphate | C16-18:1 | 5 |
| Rhodafac PA/32 | Solvay | Polyoxyethylene oleyl ether phosphate | C16-18:1 | 2 |
| Rhodafac PA/35 | Solvay | Polyoxyethylene oleyl ether phosphate | C16-18:1 | 5 |
| Crodafos SG-LQ | Croda | PPG-5-ceteth-10 phosphate | C16 | 10(PO5) |
| Crodafos O10A | Croda | Oleth-10 phosphate | C18:1 | 10 |
| Crodafos O3A | Croda | Oleth-3 phosphate | C18:1 | 3 |
| Crodafos CS2A | Croda | Ceteareth-2 phosphate | C16-18 | 2 |
| Lakeland PAE 185 | Lakeland | Phosphate ester of ethoxylated octadecanol 5 EO | C18 | 5 |
| Hostaphat KL340D | Clariant | Lauryl polyethoxy (4EO) phosphate | C12 | 4 |
| Rhodafac RM-510 | Solvay | Phosphate ester of dinonylphenol ethoxylate | | 10 |
| SPAN 60 | Croda | Sorbitan monostearate | | |
| SPAN 80 | Croda | Sorbitan monooleate | | |
| SPAN 120 | Croda | Sorbitan isostearate | | |

Example 1—Emulsifier Comparisons

TABLE 2

Emulsification results

| Emulsifier | Conc. emulsifier in toluene phase (wt./vol %) | Inclusions (Y/N) | Spherical (Y/N) | Emulsification time (min) | Max stirring speed (rpm) | Mode prior to cooling (μm) | Δ mode (μm) |
|---|---|---|---|---|---|---|---|
| Lubrhophos LF-800 | 0.016 | N | Y | | 1450 | 234 | 57 |
| Lubrhophos LF-800 | 0.05 | N | Y | 157 | 1350 | 103 | 35 |
| Lubrhophos LF-800 | 0.08 | N | Y | 105 | 1450 | 96 | 8 |
| Lubrhophos LF-800 | 0.16 | N | Y | | 800 | 19 | 17 |
| Lubrhophos LF-800 | 0.20 | N | Y | | 800 | 15 | 6 |
| Lubrhophos LB-400 | 0.016 | Y | N | 106 | 1500 | 177 | 143 |
| Lubrhophos LB-400 | 0.05 | N | Y | 168 | 1350 | 106 | 86 |
| Lubrhophos LB-400 | 0.16 | N | Y | 100 | 1450 | 97 | 17 |
| Rhodafac PA/32 | 0.16 | Y | Y | 151 | 1600 | 108 | 20 |
| Rhodafac PA/35 | 0.16 | N | Y | 108 | 1550 | 108 | 12 |
| Crodafos SG-LQ | 0.16 | N | N | 144 | 1600 | 115 | 98 |
| Crodafos SG-LQ | 0.16 | N | N | 118 | 1550 | 103 | 45 |
| Crodafos O10A | 0.16 | Y | N | 148 | 1650 | 161 | 548 |
| Crodafos O3A | 0.16 | N | Y | 87 | 1300 | 102 | 5 |
| Crodafos CS2A | 0.16 | N | Y | 70 | 1250 | 21 | 2 |
| Lakeland PAE 185 | 0.16 | Y | N | 153 | 1650 | 125 | 130 |
| Hostaphat KL340D | 0.16 | N | Y | 64 | 1200 | 112 | 34 |
| Rhodafac RM-510 | 0.16 | N | Y | 74 | 1350 | 96 | 25 |
| Span 60 | 0.2 | Y | N | 218 | 1550 | 778 | 176 |
| Span 80 | 0.1 | Y | N | 156 | 1250 | 559 | |
| Span 80 | 0.2 | Y | N | 148 | 1200 | 810 | |
| Span 80 | 0.5 | Y | N | 195 | 1600 | 218 | 123 |

TABLE 2-continued

Emulsification results

| Emulsifier | Conc. emulsifier in toluene phase (wt./vol %) | Inclusions (Y/N) | Spherical (Y/N) | Emulsification time (min) | Max stirring speed (rpm) | Mode prior to cooling (μm) | Δ mode (μm) |
|---|---|---|---|---|---|---|---|
| Span 80 | 2 | N | Y | 70 | 1250 | 99 | 5 |
| Span 120 | 0.2 | Y | N | 139 | 1250 | 907 |  |
| Span 120 | 0.5 | N | Y | 118 | 1450 | 413 | −102 |
| Span 120 | 2.3 | N | Y | 111 | 1450 | 100 | 7 |

Basically, all the tested materials function as emulsifiers. There are however differences between them. The nonionic emulsifiers, as exemplified by the three sorbitan esters, have to be used at concentrations of 2% to give good results. This means that a high amount of emulsifier has to be washed out from the beads during the recovery, which is undesirable, in particular since those emulsifiers are not water soluble and have to be washed out with solvents. Phosphate esters can be used at lower concentrations (below 0.2%) and are generally water soluble. Particularly good results were obtained with Lubrhophos LF-800, Lubrhophos LB-400, Rhodafac PA/35, Crodafos CS2A and Crodafos O3A, with Lubrhophos LF-800 and Crodafos 03A selected as top candidates. Rhodafac RM-510 also gave good results but was deselected for environmental reasons, as it is based on alkylphenol ethoxylates.

Example 2—2-Methylcyclohexanone as Solvent

Two experiments were carried out as above, but with 2-methylcyclohexanone instead of toluene. The emulsifier was Lubrhophos LF-800 and the emulsifier amounts were 0.017 wt./vol. % and 0.23 wt./vol. % respectively. The target particle size of 100 μm was reached and the visual appearance of the beads was good. Some aggregation occurred during cooling though.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if individually incorporated.

The invention claimed is:

1. A method for manufacturing agar or agarose beads, comprising the steps of:
   a) providing a water phase comprising an aqueous solution of agar or agarose at a temperature of 40-100° C.;
   b) providing an oil phase comprising a water-immiscible solvent and an emulsifier at a temperature of 40-100° C.;
   c) emulsifying said water phase in said oil phase to form a water-in-oil emulsion;
   d) cooling said water-in-oil emulsion to a temperature below a gelation temperature of said agar or agarose to form a dispersion of solidified agar or agarose beads; and
   e) recovering agar or agarose beads from said dispersion, wherein said emulsifier comprises a phosphate ester of an alkoxylated fatty alcohol.

2. The method of claim 1, wherein said water-immiscible solvent comprises toluene or xylene.

3. The method of claim 1, wherein said oil phase comprises less than 0.1 wt. % of alkyl phenols or alkyl phenol derivatives.

4. The method of claim 1, wherein said oil phase is devoid of, or essentially devoid of, alkyl phenols and alkyl phenol derivatives.

5. The method of claim 1, wherein said emulsifier comprises a mixture of phosphate monoester and phosphate diester of said alkoxylated fatty alcohol.

6. The method of claim 1, wherein said fatty alcohol comprises one or more $C_{10}$-$C_{20}$ linear or branched, primary or secondary, alkanols or alkenols.

7. The method of claim 1, wherein said alkoxylated fatty alcohol has a structure $$R_1-O-(R_2-O)_n-H \quad \text{(I)}$$

wherein:
R$_1$ is a saturated or unsaturated, linear or branched, aliphatic $C_{10}$-$C_{20}$ hydrocarbon,
R$_2$ is —CH$_2$—CH$_2$— or a mixture of —CH$_2$—CH$_2$— and —CH$_2$(CH$_3$)—CH$_2$—, and
n is 2-20.

8. The method of claim 1, wherein said emulsifier comprises a mixture of $$R_1-O-(R_2-O)_n-P(O)-OH \quad \text{(II)}$$

$$R_1-O-(R_2-O)_n-P(O)-(O-R_2)_n-O-R_1 \quad \text{(III)}$$

wherein:
R$_1$ is a saturated or unsaturated, linear or branched, aliphatic $C_{10}$-$C_{20}$ hydrocarbon,
R$_2$ is —CH$_2$—CH$_2$— or a mixture of —CH$_2$—CH$_2$— and —CH$_2$(CH$_3$)—CH$_2$—, and
n is 2-20.

9. The method of claim 8, wherein R$_1$ is a saturated or unsaturated linear aliphatic $C_{10}$-$C_{18}$ hydrocarbon.

10. The method of claim 8, wherein n is 2-10.

11. The method of claim 10, wherein n is 2-5.

12. The method of claim 1, wherein said emulsifier comprises a mixture of phosphate monoester and phosphate diester of a mixed ethylene oxide+propylene oxide adduct of a $C_{10}$-$C_{16}$ alkanol.

13. The method of claim 1, wherein said emulsifier comprises oleth-3-phosphate.

14. The method of claim 1, wherein said emulsifier comprises a $C_{10}$-$C_{16}$ ethoxylated/propoxylated phosphate.

15. The method of claim 1, wherein said emulsifier comprises an oleth-3 phosphate.

16. The method of claim 1, wherein said aqueous solution of agar or agarose comprises 1-8 wt. % agar or agarose.

17. The method of claim 1, wherein said oil phase comprises 0.01-2 wt. % of said emulsifier.

18. The method of claim 1, wherein step c) comprises mixing said water phase and said oil phase in an agitated vessel to form a water-in-oil emulsion.

19. The method of claim 18, wherein step c) further comprises passing said water-in-oil emulsion through a rotor-stator mixer to reduce a droplet size of said water-in-oil emulsion.

20. The method of claim 18, wherein step c) further comprises passing said water-in-oil emulsion through a static mixer to reduce a droplet size of said water-in-oil emulsion.

21. The method of claim 18, wherein step c) further comprises passing said water-in-oil emulsion through a porous membrane to reduce a droplet size of said water-in-oil emulsion.

22. The method of claim 1, wherein step c) comprises passing said water phase through a porous membrane into said oil phase to form a water-in-oil emulsion.

23. The method of claim 1, where step d) is performed in an agitated vessel.

24. The method of claim 1, wherein step d) is performed by passing said water-in-oil emulsion through a conduit with a longitudinally decreasing temperature gradient.

25. The method of claim 1, wherein step e) comprises adding water or an aqueous solution to said dispersion, decanting said oil phase and recovering said agar or agarose beads as a sediment.

26. The method of claim 1, wherein step e) further comprises washing said agar or agarose beads with water or an aqueous solution to remove residual emulsifier.

27. The method of claim 1, further comprising, after step e), a step f) of cross-linking said agar or agarose beads.

28. The method of claim 1, further comprising, after step e), a step f) of coupling ligands to said agar or agarose beads.

* * * * *